Feb. 6, 1940.  W. B. OSBORNE  2,189,220
PLANETARY GEAR DRIVE
Filed June 16, 1938  2 Sheets-Sheet 1

Inventor:
William B. Osborne
By: Edward C. Fitzbaugh.
Atty.

Feb. 6, 1940.    W. B. OSBORNE    2,189,220
PLANETARY GEAR DRIVE
Filed June 16, 1938    2 Sheets-Sheet 2

Inventor:
William B. Osborne
By: Edward C. Fitzhugh
Atty.

Patented Feb. 6, 1940

2,189,220

UNITED STATES PATENT OFFICE 2,189,220

PLANETARY GEAR DRIVE

William B. Osborne, Muncie, Ind., assignor to Borg-Warner Corporation, Chicago, Ill., a corporation of Illinois Application June 16, 1938, Serial No. 213,968

13 Claims. (Cl. 74—260)

The present invention relates to a change-speed transmission wherein a planetary system is incorporated in a novel manner to give two speed ratios between the driving and driven shafts, which arrangement is peculiarly adaptable for an airplane propeller drive.

It is an object of the present invention to provide in combination an improved lockup between the sun gear and the ring gear of a two-speed planetary transmission. It is a further object to provide a compact and efficient planetary structure and control therefor constituting a two-speed transmission between a driving and driven shaft. Another object of this invention is to provide an improved sun gear control including in combination a novel brake for the sun gear.

It is a still further object to provide a transmission incorporating the above features wherein backlash is eliminated, and wherein the lockup is effected through a plurality of friction engaging means without the necessity of passing through a neutral position, which is thereby made peculiarly desirable for an airplane propeller drive.

The above and other objects, advantages and uses of my invention will become more apparent from a reading of the following specification and claims taken in connection with the appended drawings which form a part of this specification and wherein:

Figure 1:
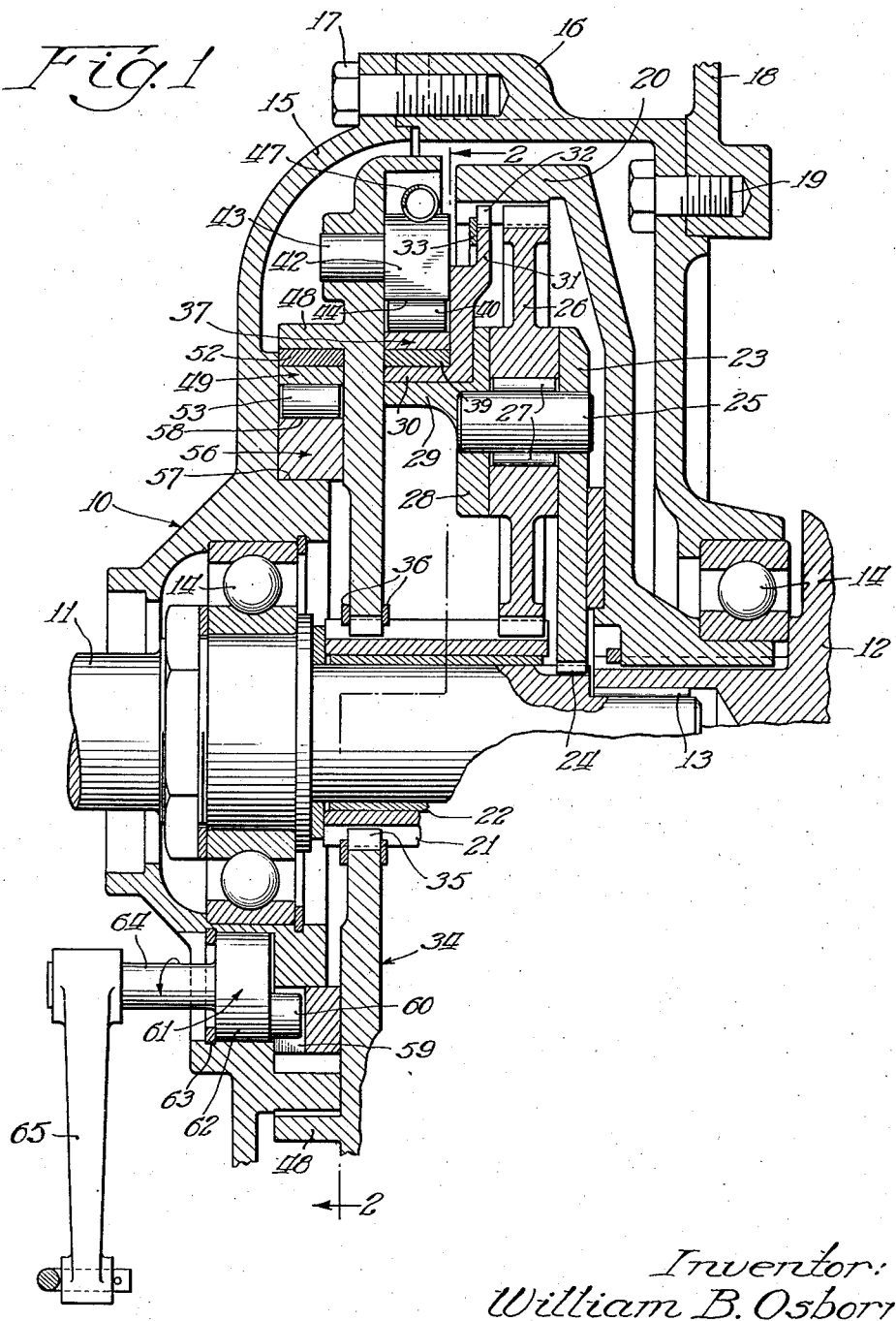
Fig. 1 is a vertical section on line 1—1 of Fig. 2 showing a preferred embodiment of my invention arranged to drive the propeller of an airplane.

Referring in detail to the figures of the drawings, a propeller transmission housing 10 has journalled therein in coaxial relationship, propeller shaft 11 and crank shaft 12, the two shafts being in telescopic relationship with roller bearings 13 therebetween. Suitable anti-friction bearings 14 are interposed between the housing and these shafts. Housing 10 is preferably formed in two complementary sections 15 and 16 fastened together by means of bolts 17 to facilitate ready assembly and maintenance. Radially extending flange 18 fastened to the housing by bolts 19, connects the same to a suitable support (not shown).

My improved plural ratio transmission includes a ring gear keyed about the forward end of the crank shaft 12 for driving relation thereto. As a means of producing a compact and efficient assembly, I propose to form this ring gear 20 in the shape of an open end drum with the inner periphery of the outer rim provided with teeth for cooperation with planet gears and clutch drum driving means, later to be described. Mounted for relative rotation about propeller shaft 11, is an elongated sun gear 21 extending within the confines of drum-shaped ring gear 20. A suitable bushing 22 is interposed between the sun gear and the shaft 11 to absorb the wear therebetween. Planet carrier 23 is drivingly connected with propeller shaft 11 at a point between ring gear 20 and sun gear 21. This carrier is preferably in the form of a plate having a central opening therethrough formed with splines 24 for cooperation with corresponding splines on shaft 11 and provided near its outer periphery with pins 25 for supporting planet gears 26 in driving relation between ring gear 20 and sun gear 21. Roller bearings 27 are interposed between the pins 25 and the planet gear 26. Looking at Figure 1, spindles 25 extend from their bearing in planet carrier 23 through planet gears 26 with their opposite ends journalled in an annular ring-like bearing member 28, the planet gear 26 thus being confined between planet carrier 23 and ring member 28. Fastening means is preferably provided for rigidly connecting planet carrier 23 to ring 28 at circumferentially spaced points between the planet gears 26 in an obvious manner (not shown). Ring member 28 is formed with a laterally extending flange or drum 29 which functions as a bearing surface for a clutch drum 30.

Clutch drum 30 is provided with a radially extending flange 31 terminating in teeth or splines 32 for connection with the internal teeth of ring gear 20. Flange 31 is maintained in nested relationship with ring gear 20 by means of snap ring 33 fitting in a groove formed in the teeth of the ring gear.

Facing the open end of ring gear 20 is a sun gear clutch and brake plate 34 fixed to the sun gear by teeth or splines 35 and confined against axial movement by snap rings 36. Mounted on the inside face of the plate 34 near its outer periphery and in cooperative relation with drum 30 is a centrifugally operated clutch for frictionally engaging and holding drum 30 to lock sun gear 21 to ring gear 20 under certain conditions to be described.

Figure 2:
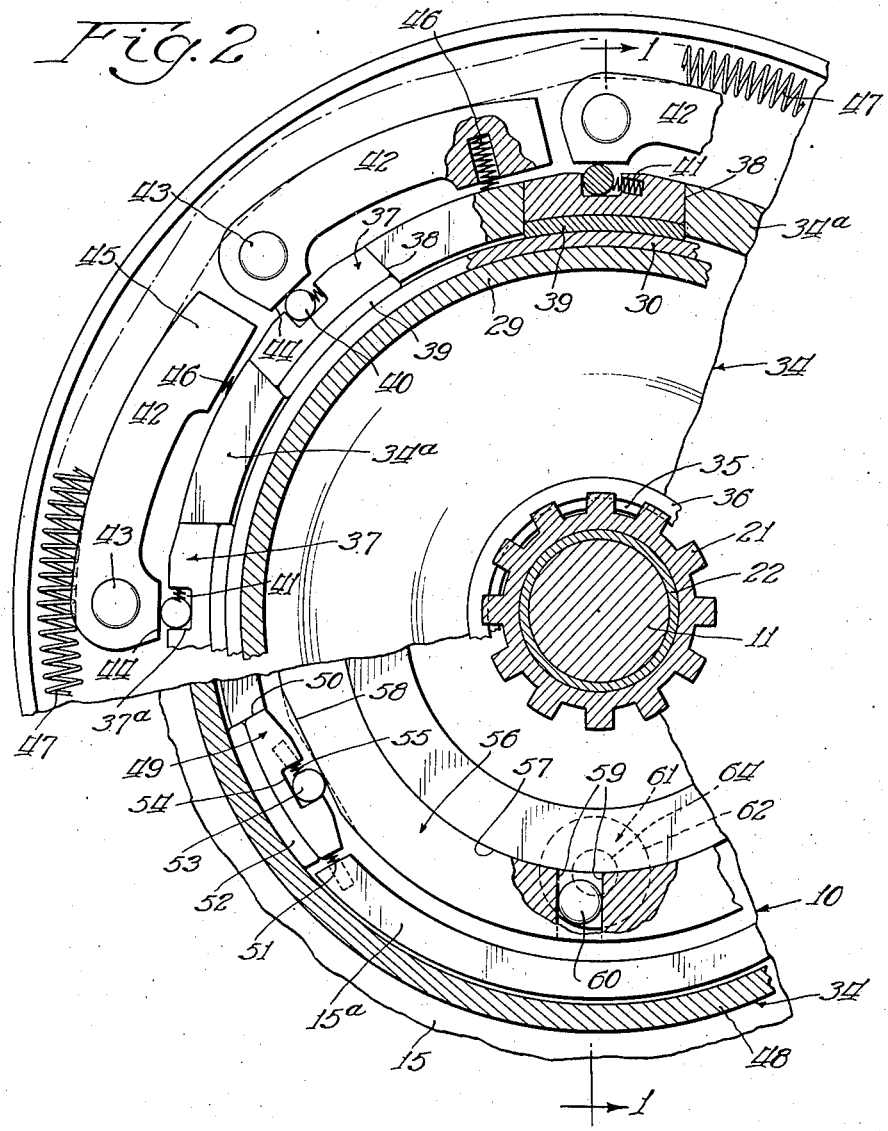
Fig. 2 is a transverse vertical section taken on the line 2—2 of Fig. 1, showing in the upper left-hand portion thereof, the centrifugal clutch structure, and in the lower portion thereof the arrangement of brake structure for controlling the sun gear clutch plate.

Referring particularly to Figure 2, this centrifugal clutch includes a plurality of circumferentially disposed arcuate shoes 37 for gripping cooperation with clutch drum 30. These shoes are mounted for radial reciprocation in guides 38 defined by protuberances 34a on plate 34 between the respective shoes, and being further provided with gripping soles 39 preferably of bronze or other suitable friction material. In the back of each of these shoes there is formed a circumferentially extending slot 37a receiving antifriction thrust rollers 40 urged in a counterclockwise direction by a spring 41. Centrifugally operated dogs 42 are pivotally mounted adjacent rollers 40 for imparting an inward radial thrust thereto for effecting the application of the clutch gripping soles 39. The dogs 42 are arcuate in shape and lie in end to end series relation, being pivoted at one end on pins 43 journalled in plate 34 and provided with a flat cam nose 44 for imparting a radial inward thrust to rollers 40 when the free end 45 is swung out by centrifugal force. This free end is normally maintained out of contact with shoes 37 and protuberances 34a on the clutch plate by means of a compression spring 46. The outward swinging of the dogs 42 is limited by a garter spring 47 embracingly engaging the outer peripheries of the arcuate dogs. By placing the pivot pin 43 of the dog 42 on a radius removed slightly in a clockwise direction from the radius on which the roller 40 is positioned when in the left hand end of its slot or cage, the requisite fulcrum and lever effect is obtained. The circumferential movement of the roller 40 in its slot effects the necessary adjustment between the two surfaces it separates without producing friction.

A brake is provided for holding and releasing the sun gear clutch plate 34 at the will of the operator for effecting the transition from one ratio to the other. Plate 34 has a flange 48 extending from the forward face thereof and defining a brake drum housing. Disposed about the inner periphery of this brake drum housing 48, are a plurality of evenly spaced arcuate brake shoes 49 mounted for radial movement in the slots 50 defined by protuberances 15a on the inside of main housing section 15. Shoes 49 are provided with springs 51 for biasing them in a clockwise direction (Fig. 2). Bronze or other suitable friction soles 52 are interposed between the shoe 49 and drum 48. Thrust rollers 53 are mounted in circumferentially extending slots 54 in the back of the shoe 49 and biased in counterclockwise direction by springs 55. The brake shoes 49 are operated into engagement with the inner periphery of brake housing 48 by means of oscillatable thrust ring 56. The inner periphery of this thrust ring is provided with a bearing 57 formed on main housing section 15, the outer periphery of ring 56 being formed with a plurality of inclined flat surfaces 58 for cooperation with rollers 53 for imparting outward radial thrust thereto. Ring 56 is formed with radially extending cam surfaces 59 engaged by the pin 60 of an eccentric 61 for oscillating the same. Eccentric 61 has a hub portion 62 retained in a suitable journal in main housing section 15 by snap ring 63, and further provided with a rearwardly extending operating shaft 64 connected with a crank 65 for manually effecting its rotation to oscillate ring 56.

Operation

With the eccentric 61 in its extreme clockwise position shown in Figure 2, the brake shoes 49 will be forced into engagement with brake housing 48 by the wedging of the rollers between inclined surfaces 58 and the shoes 49, thus holding sun plate 34 and sun gear 21 stationary. Under these conditions, with drive shaft 12 turning ring gear 20, output or propeller shaft 11 will be turned at a reduced speed by planet carrier 23, this ratio being determined by the relative sizes of sun gear 21 and planetary gears 26. To effect a transition from this ratio of drive to a one-to-one drive between shafts 11 and 12, the eccentric 61 is rotated in a counterclockwise direction by manual crank 65 to oscillate thrust ring 56 to withdraw cam surfaces 58 from wedging engagement with the rollers 53 of the brake shoes 49. As the brake shoes 49 are released, the planet gears 26 become effective to rotate sun gear 21 and sun gear plate 34. By momentarily decelerating the engine, the planet carrier may be caused to become the driving member and the ring gear 20 the reaction member, and the resulting direction of thrust of the planet gear 26 against the sun gear 21 will be the same as the direction of rotation of the already rotating parts.

The ensuing rotation of the sun plate 34 results in the centrifugal dogs 42 of the centrifugal clutch being thrown outwardly. This outward movement of the dogs 42 is effective to force the cam noses 44 inwardly against the rollers 40 to move the clutch engaging soles 39 into clutching engagement with the clutch drum 30, connected to the ring gear teeth. When relative movement between the clutch shoes and the clutch drum has been completely stopped by the action of the powerful centrifugal clutch, a one-to-one ratio between shafts 12 and 11 is established.

The above described arrangement including the centrifugal dogs 42 is found to be amply powerful to effect a reliable frictional engagement of the shoes 37 with the drum 30, while at the same time smooth in its operation, as differentiated from any of the usual abrupt lockup means such, for example, as an overdrive-type clutch.

By forming the ring gear 20, as described, and nesting a substantial part of the remaining structure therein including the planet carrier 23, the planet gears 26, the rear portion of sun gear 21, the major portion of annular ring 28 and the radially extending flange 31 of clutch drum 30, and by disposing the sun gear brake and clutch plate adjacent the open end of ring gear 20 with the centrifugal clutch means and brake means cooperating in the manner described, I have thus provided a very compact and relatively simple construction.

By providing a friction lockup between the sun gear and ring gear with an effective and powerful centrifugally operated friction clutch, I have produced a much more satisfactory operating device in that backlash is eliminated, while at the same time transition from one ratio to the other is effected without passing through a neutral position. The transition is made through a slipping friction connection which is self-energized and maintains torque on the driven shaft during the transition.

While these enumerated features of advantage are of particular significance as applied to the drive for an airplane propeller and I have shown my preferred embodiment as applied thereto, I nevertheless contemplate the use of my drive in other relations wherein similar problems and conditions exist.

It will also appear that in broader aspects of my invention, either of the concentric shafts may be made the driving shaft, with the other as the driven shaft.

Since many different embodiments of this invention, apparently differing widely, may be made without departing from the spirit thereof, it is to be understood that I do not wish to limit myself to the foregoing description further than as indicated in the accompanying claims which should be construed as broadly as the prior art will permit.

I claim:

1. In a power transmission, a power drive shaft, a driven shaft, a planetary gearing between said shafts including a sun gear and a ring gear, a centrifugal clutch adapted to establish a direct drive connection between the sun gear and the ring gear, a brake for stopping the rotation of the sun gear at will to effect a change in the relative speeds of rotation of said shafts, said centrifugal clutch being operable in response to the rotation of said sun gear upon the release of said sun gear brake.

2. In a plural ratio drive between a driving shaft and a driven shaft, a planetary gearing including a ring gear fixed to one of said shafts, a sun gear rotatable about the other of said shafts, planet gears interposed between said ring gear and said sun gear, a planet carrier fixed to said second shaft, the combination therewith of means, including brake means for selectively stopping the rotation of said gun gear for effecting the operation of said shafts at different speeds, and clutch means operable upon the release of said stopping means and in response to the consequent rotation of said sun gear to effect a direct drive connection between said sun gear and said ring gear.

3. In a plural ratio drive between a driving shaft and a driven shaft, a planetary gearing including a ring gear fixed to one of said shafts, a sun gear rotatable about the other of said shafts, planet gears interposed between said ring gear and said sun gear, a planet carrier fixed to said second shaft, the combination therewith of means, including brake means for selectively stopping the rotation of said sun gear for effecting the operation of said shafts at different speeds, and clutch means between said sun gear and said ring gear, centrifugal means for operating said clutch means, said last named means being operated in response to the rotation of said sun gear upon release of said brake means.

4. In a power transmission between a driving and driven shaft including a ring gear in driving connection with one of said shafts, a planet carrier in driving connection with the other of said shafts, a sun gear rotatable about the latter shaft, planet gears on said carrier drivingly connecting said ring gear and said sun gear, the improved compact arrangement comprising forming said ring gear in the general shape of an open end drum with teeth on the inner periphery thereof for cooperation with the teeth of said planet gears, a disk-like clutch and brake plate fixed to said sun gear adjacent the open end of said ring gear, a clutch drum driven by said ring gear, centrifugal clutching means carried by said disk for clutching said drum, brake means associated with said disk for resisting the rotation of the same to hold the sun gear against rotation to effect a ratio between the driving and driven shaft, said brake means being releasable to permit the rotation of said sun gear and disk for operating said centrifugal clutch to lock said disk and ring gear together to effect a one-to-one drive between said driving and driven shafts.

5. In a power transmission between a driving and driven shaft including a ring gear in driving connection with one of said shafts, a planet carrier in driving connection with another of said shafts, a sun gear rotatable about the latter shaft, planet gears on said carrier drivingly connecting said ring gear and said sun gear, the improved compact arrangement thereof comprising forming said ring gear in the general shape of an open end drum with teeth on the inner periphery thereof for cooperation with teeth on said planet gears, a disk-like clutch and brake plate fixed to said sun gear adjacent the open end of said ring gear, a clutch drum comprising radially extending means having teeth engaging the ring gear teeth, said drum being further provided with a bearing on said planet carrier, centrifugal clutching means carried by said disk for clutching said drum, brake means associated with said disk for resisting the rotation of the same to hold the sun gear against rotation to thereby effect a ratio between the driving and driven shafts, said brake being releasable to permit the rotation of said sun gear and disk for operating said centrifugal clutch to lock said disk and ring gear together for effecting a one-to-one drive between said driving and driven shafts.

6. Structure as defined in claim 4 wherein said centrifugal clutch means comprises a plurality of circumferentially spaced arcuate shoes, a circumferentially extending slot in the back of each shoe defining a thrust ball cage, a steel ball in each of said cages, an arc-shaped centrifugal level pivoted at one end adjacent each ball and being provided with a cam portion engaging said ball for forcing said shoes into engagement with said drum when the free ends of said levers are thrown out by centrifugal force.

7. In a plural ratio drive between a driving shaft and a driven shaft, a planetary gearing including a ring gear fixed to one of said shafts, a sun gear rotatable about the other of said shafts, a plate drivingly connected to said sun gear, planet gears interposed between said ring gear and said sun gear, a planet carrier fixed to said second shaft, the combination therewith of means, including brake means for selectively stopping the rotation of said sun gear for effecting the operation of said shafts at different speeds, and clutch means operable upon the release of said stopping means and in response to the consequent rotation of said sun gear to effect a lockup between said sun gear and said ring gear, said brake means comprising a brake drum on said plate, a ring mounted on a fixed support for limited oscillation relative thereto, a plurality of arcuate shoes disposed about the periphery of said drum for frictional engagement therewith, said shoes each being provided with ball cages in the rear thereof receiving balls for engagement with oppositely disposed inclined surfaces on said oscillatable ring, manual means for selectively oscillating said ring to effect the wedging of said balls against said inclined surfaces to cause application of said brake to stop the rotation of said sun gear clutch plate.

8. The structure defined in claim 7 wherein said manual means for selectively oscillating said ring comprises a cam surface on said ring, an eccentrically mounted pin engaging said cam surface.

9. In a plural ratio drive between a driving shaft and a driven shaft, a planetary gearing including a ring gear fixed to one of said shafts, a sun gear, planet gears interposed between said ring gear and sun gear, a planet carrier fixed to the other of said shafts, means for selectively stopping the rotation of said sun gear for effecting the operation of said shaft at different speeds, and a friction clutch means operable upon the release of said stopping means and in response to the consequent rotation of said sun gear to effect a lock-up between said sun gear and said ring gear.

10. In a plural ratio drive between a driving shaft and a driven shaft, a planetary gearing including a ring gear fixed to one of said shafts, a sun gear, planet gears interposed between said ring gear and sun gear, a planet carrier fixed to the other of said shafts, means for selectively stopping the rotation of said sun gear for effecting the operation of said shaft at different speeds, and friction clutch means operable upon the release of said stopping means and in response to the consequent rotation of said sun gear to effect a direct drive connection between said sun gear and said ring gear.

11. In a plural ratio drive between a driving shaft and a driven shaft, planetary gearing including a ring gear drivingly connected to the driving shaft, a sun gear, planet gears arranged to transfer drive from said ring gear to said sun gear at a reduced ratio, a planet carrier on which said planet gears are journalled, said carrier being drivingly connected to the driven shaft, means for selectively stopping the rotation of said sun gear for effecting the operation of said shaft through said reduced ratio drive, and friction clutch means operable upon the release of said stopping means and in response to the consequent rotation of said sun gear to effect a lock-up between said sun gear and said ring gear.

12. In a power transmission, a housing, a planetary gearing including an element adapted at times to be locked to said housing and thereby restrained against rotation, and means for so locking said element, said means including a brake drum drivingly associated with said element, an operating ring interposed between said brake drum and said housing for oscillation about the axis of element, said ring being formed with a cam surface, a brake shoe mounted in said housing for radial movement into braking engagement with said drum, a roller interposed between said cam surface and said brake shoe for transmitting thrust from said ring to said shoe, when the ring is oscillated, and means for oscillating said ring.

13. A transmission as defined in claim 12, wherein said operating means comprises an eccentric journalled in the housing and having an eccentric pin engaging said ring.

WILLIAM B. OSBORNE.